Aug. 20, 1935.    C. A. HARRISON ET AL    2,011,856
AUTOMOBILE HEATER
Filed Sept. 8, 1931
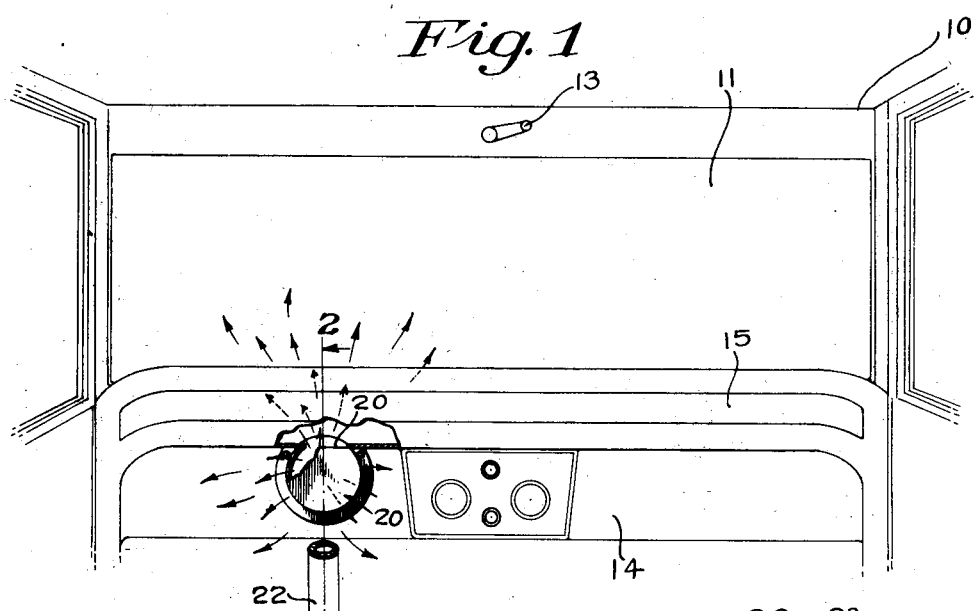
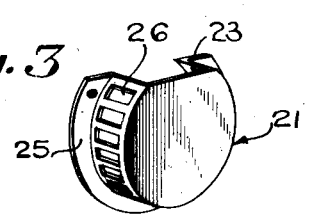
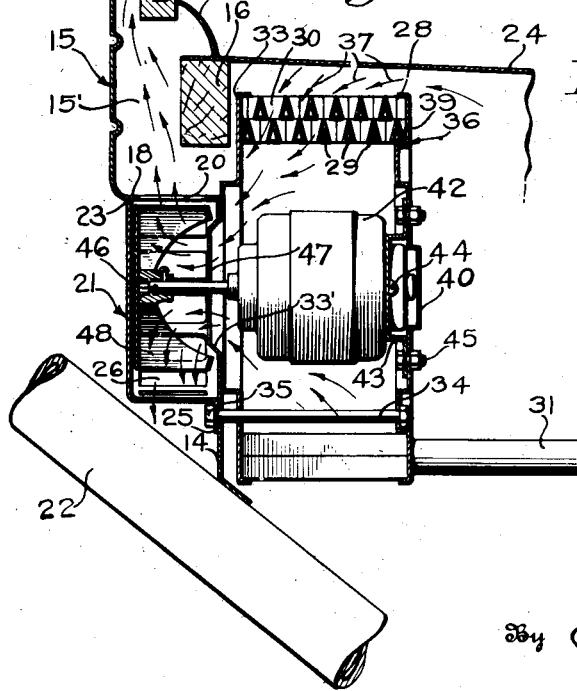
Inventors
Charles A. Harrison,
George W. Gerstung,
By Bean Brooks & Henry
Attorneys Patented Aug. 20, 1935

2,011,856

UNITED STATES PATENT OFFICE 2,011,856

AUTOMOBILE HEATER

Charles A. Harrison and George Walter Gerstung, Lockport, N. Y.

Application September 8, 1931, Serial No. 561,742

1 Claim. (Cl. 20—40.5)

This invention relates to automobile heaters and heating systems and has particular reference to heaters wherein energy is derived from the water circulating system of the engine of the automotive vehicle.

Heaters have been proposed heretofore for use in conjunction with automotive vehicles which derive their heating energy from the circulating water system of the engine of the vehicle. Certain of these systems depend for the dissemination of heat upon a circulation of air which is drawn from the space surrounding the engine and included under the hood or bonnet of the car. The air is drawn from this confined space, circulated over the heating element and passed into the body of the car whereby the same is kept in a worm and comfortable condition.

In certain of these methods, therefore, the circulated air is contaminated with gasoline vapors which may have inadvertently dripped or leaked from the fuel supply system of the internal combustion engine, with vapors of oil and partially decomposed lubricants which have come in contact with heated portions of the engine and been subsequently vaporized, and with oil fumes which generally are ejected from the crank case of the engine into the space under the hood of the car.

The circulation of air so contaminated within the body of the vehicle produces disagreeable odors within the body of the vehicle and materially decreases the personal comfort of the occupants thereof. Further, air so laden with gasoline and oil fumes exerts a deleterious action upon the interior finish of the car, settles upon and impregnates the cloth upholstery thereof, changing the color of such cloth upholstery and oftentimes leaves a deposit or film of soot and grease. Further, air so laden is prone to deposit the fumes of gasoline and oil upon leather upholstery and produce thereupon a film which resists removal with ordinary cleansing materials but which may be removed only by the aid of special cleansing treatments.

A further disadvantage of heaters deriving their circulating air from the space under the hood or bonnet of the car, and air which is therefore in contact with the engine of the automotive vehicle, resides in the fact that inadvertent disengagement or dislocation of certain portions of the engine, as for instance the exhaust manifold, permits contamination of the atmosphere surrounding the engine with poisonous fumes of incompletely burned fuel. These incompletely burned gases and vapors contain a relatively large proportion of poisonous carbon monoxide and when such air is circulated within the body of the vehicle the atmosphere of the air contained therein is contaminated with and rendered poisonous by the presence of carbon monoxide with the attendant possibility of asphyxiation of the occupants thereof.

Further, the types of heater presently in use generally provide for the provision of a blast of heated air into and through the car in one direction rather than provide for a uniform distribution of the heated air in all directions throughout the interior of the vehicle. It is, therefore, possible to provide heating means for the interior of the automotive vehicle and due to ineffective distribution of the heated air within the body of the vehicle frost or snow may collect upon and freeze on the windshield of the car and thus obstruct the clear vision of the operator thereof.

The instant invention provides a device for heating and circulating air within the body of an automotive vehicle whereby such heated air is distributed in substantially all directions, and, further, in such fashion that the heated air is caused to flow over the interior of the windshield and prevent the deposition of frost or snow thereon.

The invention further provides a device for heating and re-circulating air contained within the body of the automotive vehicle, and air which is not contaminated with poisonous fumes or vapors obtained from gasoline, oil or the exhaust of the internal combustion engine of the car.

In the drawing attached hereto:

Fig. 1 is a showing of the interior of the automotive vehicle with the instant device attached thereto.

Fig. 2 is a section along line 2—2 of Fig. 1 on an enlarged scale.

Fig. 3 is a perspective view of the special heated air distributing device or fan housing.

Fig. 4 is a rear view of the heating unit housing and assembly.

Referring more particularly to the drawing an automotive vehicle is designated generally at 10 and is provided with a front glass panel or windshield 11 whose lower edge is adapted to seat within a channel member 12 (Fig. 2) forming a sill therefor and making a substantially airtight connection therein. For ventilation, the windshield may be raised or lowered to and from the sill 12 by means of the lever arm 13 through suitable gearing and clutching means (not shown). The vehicle is further provided with an instrument panel or board 14 of a conventional design which projects across the interior of the vehicle and is normally positioned in front of the operator of the vehicle and under the windshield. A shaped and curved metal strip 15 is superposed on the instrument board 14 having its face projecting outwardly from the instrument board and forming a decorative strip between the instrument board and the sill 12 of the windshield.

The windshield receiving channel or sill 12 is connected to the cross member 16 by means of the beveled or bead member 17. The cowl portion 24 of the vehicle is attached to the cross member 16 in any suitable fashion. The decorative panel 15 is formed with an inwardly projecting flanged lower portion 18 to form a tightly fitting connection with the instrument board 14, and is also formed with an upper flange 19 extending toward and terminating short of the windshield 11. In practice the instrument board 14 and the decorative panel 15, together with their connecting offsetting shoulder 18, may be formed from a single sheet of metal. There is thus provided a space between the panel 15 and the windshield which space 15' permits of free and unimpeded circulation of air from the windshield when elevated into the space beneath the cowl or behind the instrument board so as to ventilate and cool that portion of the automobile.

A fan housing or air distributing casing 21, illustrated in Fig. 3, is positioned upon the instrument board 14, as for instance in front of the driver, or behind the steering column 22. This housing 21 is depicted as being cup shaped and formed with suitable attaching flanges 25 thereon for mounting. Radial openings 26 in the periphery of the housing permit the outflow of warm air laterally as well as downwardly for effecting the proper distribution of the heat in the car. In order to direct a portion of the heat against the windshield, there is formed in the wall 18 a comparatively large opening 20 over which fits the cut away side 23 of the housing so that the warm air discharged through such cut away side will pass through the opening or port 20 into the ventilating space or channel 15' and upwardly against the windshield. This warms the windshield glass and thereby avoids the accumulation of frost or moisture thereon. Consequently, clear vision through the windshield is maintained.

A circular radiator or heating unit 28 is positioned under the cowl 24 adjacent to the air distributing member or fan housing 21 and substantially axial therewith but to the rear of the instrument board. The heating core or unit comprises a multiplicity of confined cellular passageways 29, which are interconnected to permit passage of heating fluid therethrough, and of air passageways 30, providing a sufficiently large surface area of the outer portions of the cells or passageways for the passage therethrough of air to be heated. An inlet nipple 31 and an outlet nipple 32 are provided in the heating unit 28 whereby fluid communication is made with the source of heating fluid, as for instance the water cooling system of the internal combustion engine.

The fan housing or heated air distributing member and the radiator 28 are securely attached to the instrument board of the vehicle and one to the other by means of the flange 25 upon the fan housing and a suitable inner housing member 33 which encloses and retains the cellular heating unit. The radiator 28 is clamped between a front plate 33 and a back plate 36 which are in turn connected to the instrument board by the use of any convenient means whereby the same may be readily assembled, as for instance by means of the bolts 34 and nuts 35 which also clamp the flange of the fan housing in position on the instrument board. The plates 33 and 36 shut off the entrance of air into the central portion of the cylindrical heating unit except by passage through the cells of the core as indicated by the arrows marked at 37.

The back plate 36 is provided with corrugated or recessed portions for providing additional strength to the plate and for providing receiving and supporting members for certain portions of the heating unit. Thus, the recessed peripheral portion 39 is provided for receiving and retaining one side of the cylindrical heating unit 28, and a substantially centrally disposed recessed portion 40 is provided as a housing for one end of an electric motor 42 which is disposed within the heating core.

This motor constitutes a driving means for the air circulating means and is disposed within the heating core. A motor mounting clamp 43 is attached to the motor by suitable means such as the screws 44, and the clamp 43 is in turn attached to the end plate 36 by means of suitable securing means, as for instance the bolts 45. The shaft 46 of the motor extends through an opening 47 in the instrument board 14 and is adapted to carry thereon a fan 48 of the centrifugal type which is adapted to cause a flow of air in a transverse vertical sheet discharging through the slots 26 and the cut away side 23 of the air distributor 21.

The plate 33 is provided with a central opening having a tapering conical wall 33' which is extended through the opening 47 of the instrument board into the fan housing 21 so that air drawn inwardly through the cellular radiator 28 will pass through the tapering wall opening 33' in a concentrated blast and is thence distributed radially in a more or less sheet form, discharging downwardly toward the feet of the occupants of the front seat, laterally in both directions across the front of the instrument board, and upwardly through the opening 20 across the windshield glass. This provides a circulation of the air which is practically confined to the air within the passenger compartment free from all fumes and gases from around the engine, the circulation being from beneath the cowl (or the compartment back of the instrument board) through the heating element 28, thence passing through the instrument board from the rear side to the front side thereof where it is discharged for being subsequently induced to flow from the front side of the instrument board down beneath the latter and back to the element 28 for reheating. Such a circulation prevents the trapping of any of the heated air behind the instrument board, and results in an efficient discharge of warm air at the front side of the instrument board where it gives the most comport to the passengers. Further, by discharging in all directions from the front side of the instrument board the heated air is distributed so that both occupants of the front seat derive benefit from the heater, and by reason of the radial discharge, the concentration of a heated blast in one direction or against one occupant is avoided.

It will thus be clearly seen that the instant device provides a means for heating and recirculating air within the body of an automotive vehicle. The heated air is distributed and disseminated by means of a fan which is adapted to deliver heated air radially of the fan and transversely of the car so as to warm both passengers or occupants on the front seat. Further, the heated air is delivered adjacent to and across the inner side of the windshield whereby the windshield is kept free of frost or snow.

What is claimed is:

In a motor vehicle body, a windshield, a cowl extending forwardly of the windshield and forming a continuation of the body compartment, a downwardly extending panel at the rear of the cowl closing the upper portion of the space under the cowl and having a rearward offset affording a channel which opens along the bottom edge of the windshield, a heat exchanger adapted for connection with an engine cooling system and located in the space forward of said panel, a combined deflector and shield located rearwardly of the plane of the panel and under said offset and a motor driven draft producing means within said combined deflector and shield to flow air from under the cowl through the heat exchanger and partly into said channel and partly over the face of the panel.

CHARLES A. HARRISON.
GEORGE W. GERSTUNG.